Nov. 2, 1926.
R. B. MILLARD
BUBBLE TOWER
Filed April 29, 1924   3 Sheets-Sheet 1
1,605,263
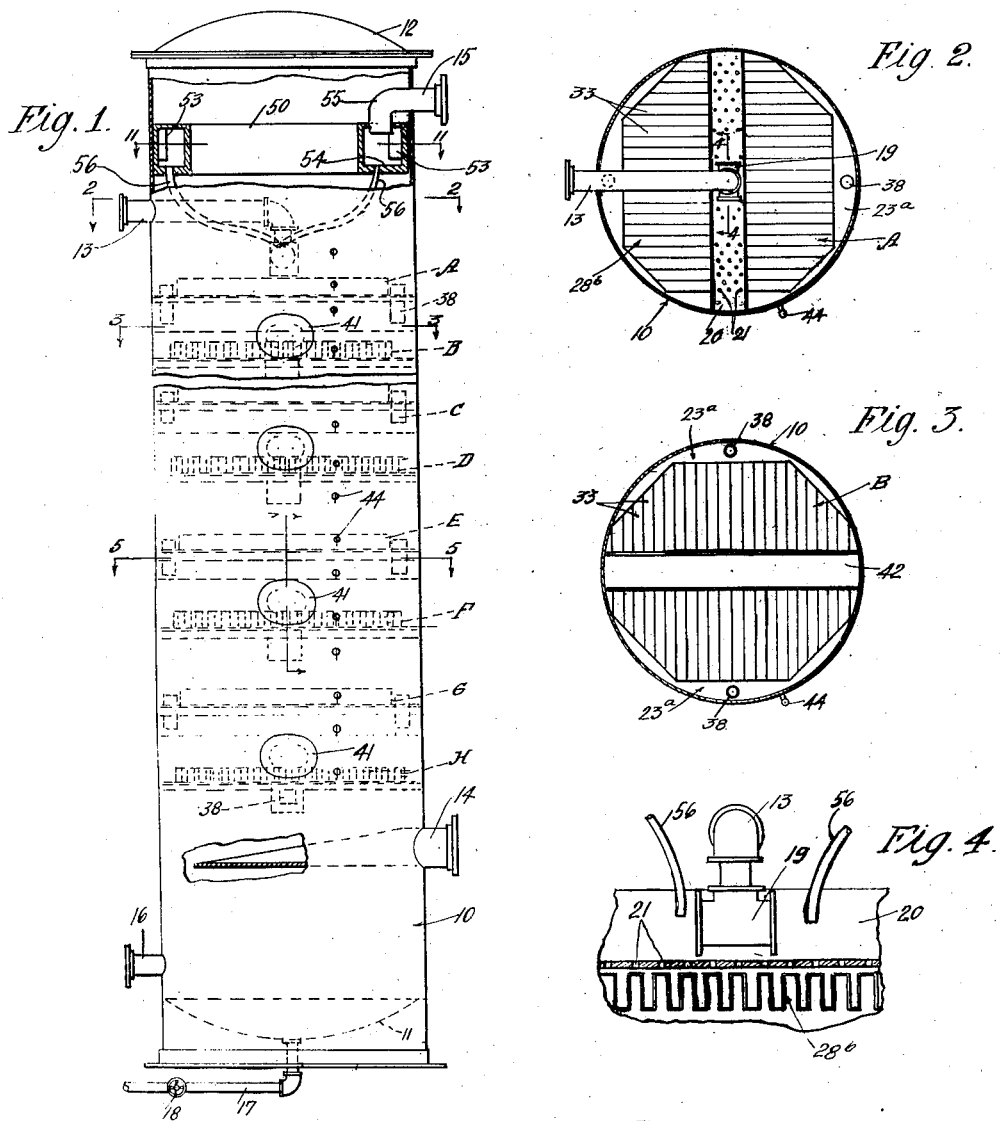
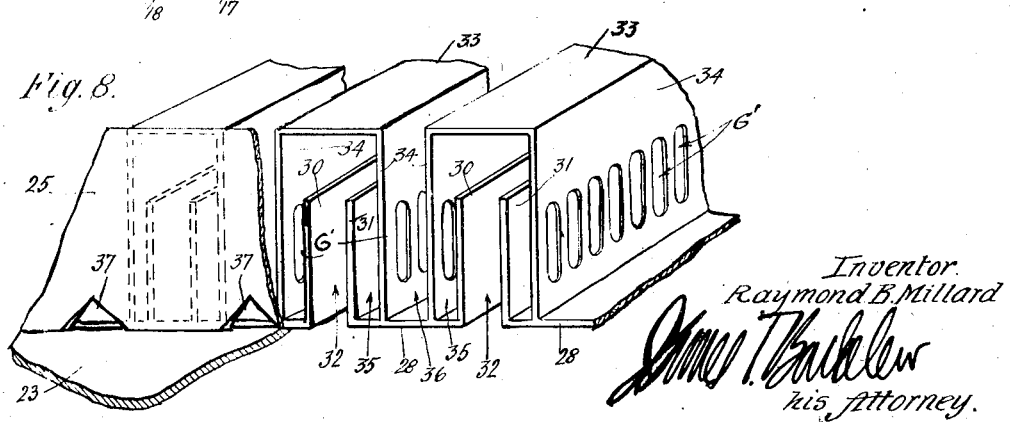
Inventor.
Raymond B. Millard
his Attorney.

Nov. 2, 1926.

R. B. MILLARD

BUBBLE TOWER

Filed April 29, 1924    3 Sheets-Sheet 2

1,605,263

Inventor.
Raymond B. Millard.
his Attorney.

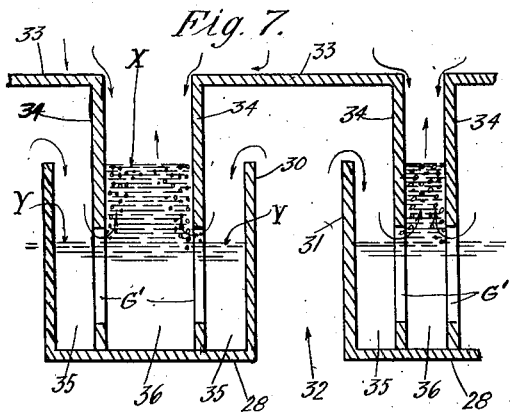
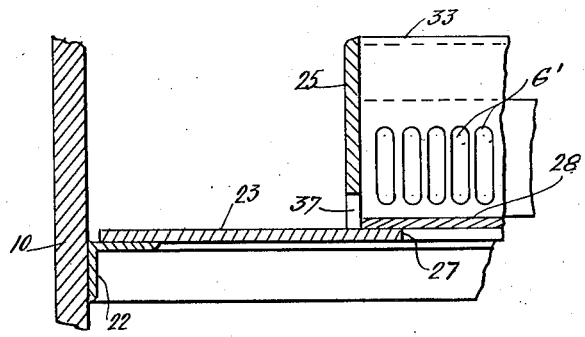
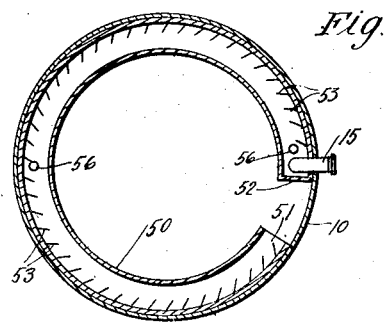
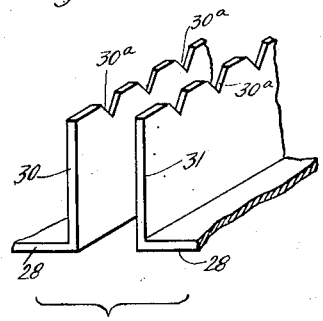

Patented Nov. 2, 1926.

1,605,263

UNITED STATES PATENT OFFICE.

RAYMOND B. MILLARD, OF LOS ANGELES, CALIFORNIA, ASSIGNOR, BY DIRECT AND MESNE ASSIGNMENTS, TO SOUTHWESTERN ENGINEERING CORPORATION, OF LOS ANGELES, CALIFORNIA, A CORPORATION OF CALIFORNIA.

BUBBLE TOWER.

Application filed April 29, 1924. Serial No. 709,811.

This invention relates generally to improvements in apparatus used in the treatment of vapors, gases or liquids. More specifically it has to do with so-called "bubble towers" which are put to the following uses, among others; the absorption of gases by liquids, the release of gases from liquids, the evaporation of liquors, the refluxing of liquids by vapors, the separation of non-homogeneous vapors by fractionation; and the washing and agitation of liquids and gases.

In order to more clearly point out the principles of tower construction and operation, it will be of advantage to describe a typical embodiment of the invention and assume, for purposes of description, that the particular structure under consideration is to be used for carrying out one specific process. With this in mind, the application and use of the device in connection with other processes will be immediately apparent to those skilled in the art.

As my example, I have chosen to describe the tower as used in the mixture of gas and oil, but the limitation of the description to this one choice is made with the distinct reservation that I am not thereby limiting the invention or inferring that the tower is incapable of being put to other use.

Generally speaking, the bubble tower may be described as a tank or shell through which oil and gas flow in opposite directions, both substances being interrupted in their flow by passage through "bubble caps" where they become more or less mixed. It is among the objects of my invention to provide a tower which shall be of high efficiency, that is, one which shall handle a comparatively large volume of gas and oil in unit time and shall thoroughly mix the substances during their periods of contact.

I have so constructed and arranged the bubble caps that the area available for the passage of gas and oil is comparatively large in proportion to the cross sectional area of open portions of the tank, so a large volume of gas may be handled without creating excessive velocities and causing consequent "blowing" of liquid seals.

The liquid is forced to follow definite paths and in its flow each of its particles is repeatedly exposed to incoming gas which is admitted through orifices opening into the channels defining these paths. In this way intimacy of contact between oil and gas is assured, and a most thorough and extremely even mixing of substances is accomplished as they pass through each of the several bubbling units. Furthermore, the gas and oil are definitely held to their predetermined paths, eliminating the danger of "short circuiting" either the gas or oil and thus insuring that all parts of the bubbling units are functioning efficiently and that all parts of the oil and gas bodies are receiving full treatment no matter through what part of the units they may be passing.

In passing from unit to unit, the oil rests temporarily in a drainage chamber where it settles or becomes quiescent, thus eliminating or reducing its "foaming" action.

While all bubbling units are of identical construction, I provide each with separately adjustable overflow pipes whereby the oil in the several units may stand at different levels to vary the depths of the liquid seals. Thus I may render the several units operative under differential pressures to compensate for losses in pressure as the gas flows upwardly from unit to unit.

The structural features of the tower are such as to allow easy assembly, accurate alinement and leveling, and permit of ready inspection. The structure is sufficiently sturdy and rigid to withstand service conditions, and may be fabricated and erected at comparatively small cost.

Other objects and novel features of the invention may be discussed to better advantage in connection with the following detailed description, reference being had to the accompanying drawings, in which:

Fig. 1 is a side elevation, partly in broken-away section, of the tower;

Fig. 2 is a horizontal section on line 2—2 of Fig. 1;

Fig. 3 is a horizontal section on line 3—3 of Fig. 1;

Fig. 4 is a section on line 4—4 of Fig. 2;

Fig. 7 is an enlarged section on line 7—7 of Fig. 5, showing the paths of oil and gas flow through a typical portion of a bubbling unit;

Fig. 8 is a fragmentary perspective view showing assembly features of a bubbling unit;

Fig. 9 is an enlarged section on line 9—9 of Fig. 5; and

Fig. 10 is a perspective view of a modified form of gas nozzle;

Fig. 11 is a horizontal section on line 11—11 of Fig. 1.

Figure 5:
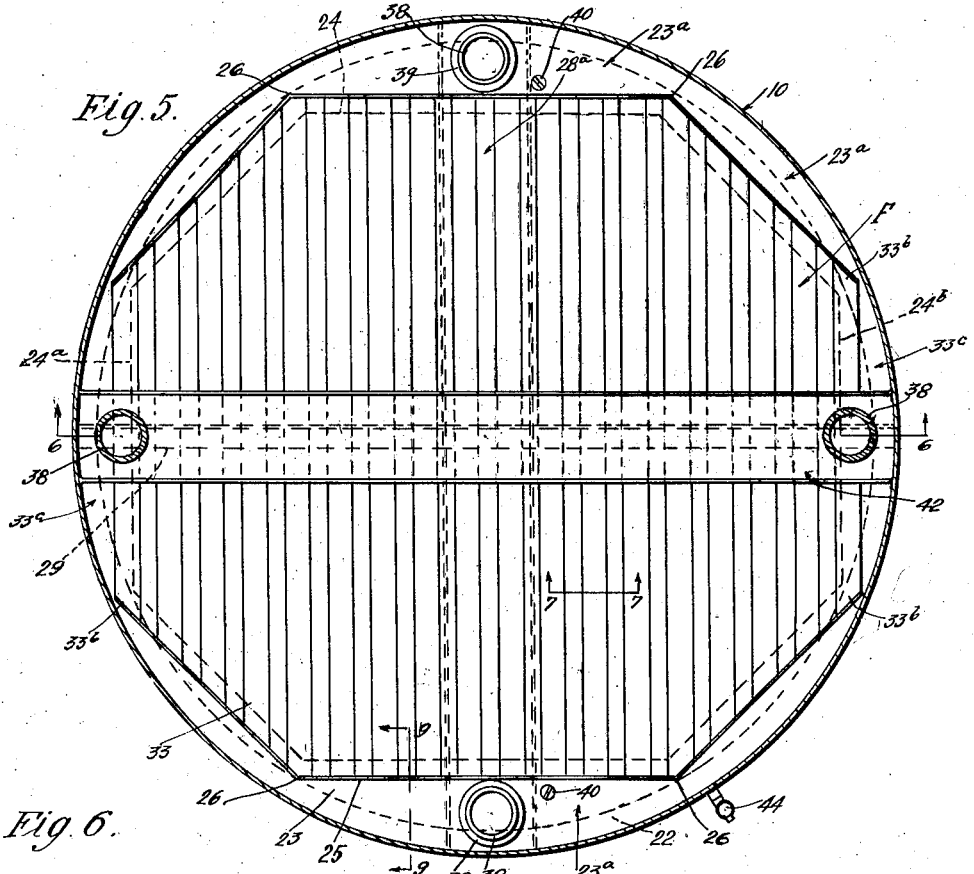
Fig. 5 is an enlarged horizontal section on line 5—5 of Fig. 1.

In the drawings the numeral 10 designates the sidewalls of a cylindrical shell or tank having a closed bottom 11 and a dome 12. An inlet pipe 13 provides for the admission of oil at the top of the shell; inlet pipe 14 provides for the admission of gas to the bottom of the shell; pipe 15 is for the withdrawal of free gas from the dome; pipe 16 is for the withdrawal of the mixed oil and gas; and drain pipe 17 may be opened by valve 18 to drain the shell between charging periods.

Inlet pipe 13 terminates centrally of the shell in a distributing T 19 which delivers oil to delivery trough 20, the latter extending diametrically across the shell and preferably being butt welded thereto. The bottom of trough 20 is apertured as at 21 whereby it may deliver its charge of oil to the uppermost bubbling unit A. Bubbling units A, B, C, D, E, F, G and H may be provided in any desired number and are vertically spaced at suitable intervals to insure maximum gas and oil mixing efficiency.

Figure 6:
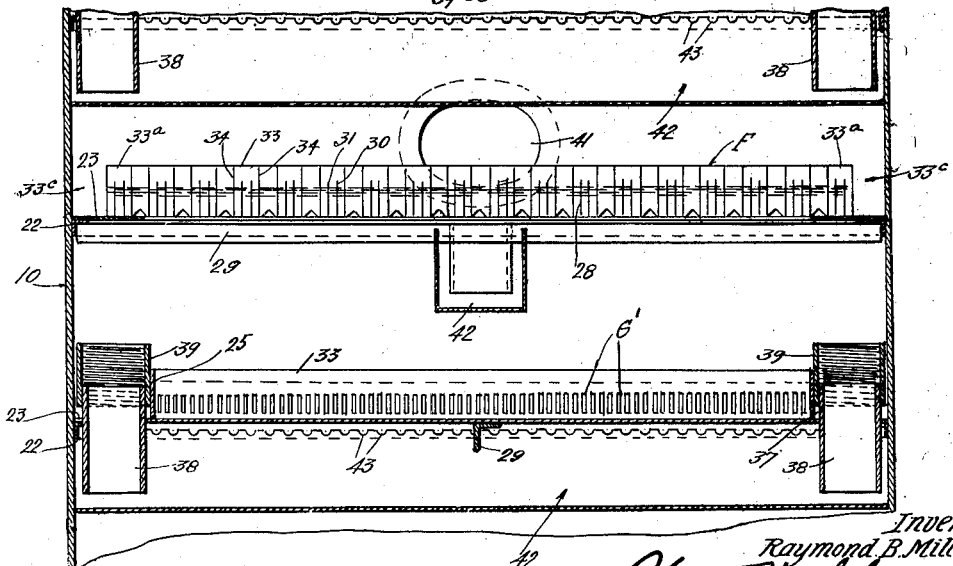
Fig. 6 is a vertical section on line 6—6 of Fig. 5.

Since all the bubbling units are of identical construction, I will described but one in detail, referring to Figs. 5 to 9 for this purpose. Welded to the inner peripheral face of shell 10 is an annular ring 22 which supports and to which is welded a ring plate 23. The central aperture of the ring plate is preferably of polygonal outline, and spaced from the defining edge 24 of this aperture are vertically extending partition plates or walls 25. The end stretches 24$^a$ and 24$^b$, however, need have no partition plate as I provide other means, to be later described, for providing a vertical wall at these points. It will be noted that corners 26, where the walls join, are spaced from shell 10 so as to allow passage of oil therepast. The spaces 23$^a$, defined by plate 23, shell 10 and walls 25, provide oil drainage and settling compartments for the bubbling units.

The portion 27 of plate 23 (Fig. 9) which extends inwardly from walls 25 serves as ledge to support the ends of oil troughs 28 which extend in parallelism across the shell. Troughs 28 are end welded to walls 25 and are supported at their centers by cross bar 29 which extends diametrically across the shell and is end welded to shell 10 or ring 22.

The opposed sides or flanges 30, 31 of adjacent troughs are spaced apart to form nozzles 32.

Caps 33 are in the form of inverted channels, the opposite legs or flanges 34 of which extend into adjacent oil troughs but are spaced horizontally from sides 30, 31 whereby each trough is longitudinally divided into three channels, namely, the two outer channels 35, and the intermediate channel 36.

Orifices G' in the sides 34 of the caps allow oil and gas communication between channels 35 and 36. The slot-like orifices are preferably of as small width as practicable, and as many are placed in each side 34 as is practicable; so that a large total volume of gas may be passed in fine streams. For instance these slots may be one-sixteenth inch wide and spaced apart just far enough to obtain a strong web between them. The lower edges of caps 33 bear on the bottoms of troughs 28, while the cap ends are butt welded to walls 25.

Walls 25 are provided with drainage or oil pressure equalizing openings 37 (Figs. 6, 8 and 9) which are in register with intermediate channels 36 and thus provide drainage communication between troughs 28 and spaces 23$^a$.

Diametrically opposite overflow pipes 38 extend vertically through and are welded to plate ring 23. Pipes 38 are preferably in alinement with the central oil trough 28$^a$ (Fig. 5) and have vertically adjustable collars 39 threaded on their upper ends, which collars are adapted to vary the effective height of the pipes whereby the depth of oil allowed to remain in the spaces 23$^a$ and hence in troughs 28 may be varied to suit conditions. Drain plugs 40 in ring 23 may be removed to allow complete drainage of the unit, these plugs and collars 39 being accessible through hand holes 41.

Pipes 38 extend downwardly into and deliver overflow oil to distributing trough 42 which extends diametrically across the shell and is butt welded to the inner peripheral face thereof. The upper edges of trough 42 are notched or serrated at 43 (Fig. 6) so when oil overflows said edges it will fall in a plurality of finely divided streams rather than in a solid sheet.

Now assume that oil be admitted through pipe 13 and that no gas be flowing through pipe 14. Also assume that collars 39 are threaded down below the tops of flanges 30, 31. In actual operation collars 39 are extended well above these flanges, but the assumption will aid in description since we are also assuming that there is no gas pressure to maintain the liquid level in channels 35 below flanges 30, 31. The oil flows out through apertures 21 in delivery trough 20, and, since this trough is disposed at right angles to the longitudinal extent of the oil troughs 28ᵇ in unit A (Fig. 2) such oil will be diverted by the tops or webs of caps 33 into intermediate channels 36 of said unit. The oil also flows through orifices G into channels 35 and through openings 37 into spaces 23ᵃ. As soon as the oil level rises to the top of collars 39, it overflows into pipes 38 and is thereby delivered to distributor 42. Continued flow of oil causes an overflow through serrations 43 and onto the unit B, next below.

Now it will be noted that the oil channels in adjacent units are angularly disposed with respect to one another and that the distributor beneath a given unit extends transversely of the oil channels in the unit next below. Thus the distributor delivers oil to the center of each oil underlying trough and the oil will flow horizontally towards openings 37. This arrangement is further advantageous in that it insures an even mixing of oil with gas which flows through orifices G'. To explain, were the troughs in adjacent units to be in alinement and the overflow pipes and distributors still arranged to deliver oil to the centers of all oil troughs next below, such oil as had passed through the comparatively short oil troughs would be the first to flow through the overflow pipes and might well be the first to be delivered to the underlying short oil troughs in the unit below. Since such oil passes through the shorter troughs traverses a comparatively few number of gas orifices G', and therefore has less treatment than the rest of the oil, this condition would lead to uneven treatment of the oil. With my arrangement, however, the direction of oil flow is changed as it passes from one unit to another, and oil which has flowed through shorter tubes has an equal chance with the rest of the oil body to flow into the longer troughs below. This brings about even treatment.

The outer flanges of end caps 33ᵃ preferably have no gas orifices and they therefore fill the gap along stretches 24ᵃ and 24ᵇ between the ends of walls 25, and preferably the ends 33ᵇ of caps 33ᵃ contact with shell 10 to close off spaces 23ᵃ from spaces 33ᶜ so no oil may enter and lie idle in these latter spaces.

Now assume that all the units are charged with oil and that gas be admitted through pipe 14. This gas will flow upwardly through nozzles 32 in the lowermost unit H and be deflected downwardly by the tops of caps 33 and into compartments 35. The gas pressure will be sufficient to depress the oil in these compartments, causing a coincident rise in the oil level in compartments 36, until the gas has cleared a path for itself through orifices G', the gas body being broken up in its passages through orifices G'. Thereupon, the gas bubbles up through and mixes with the oil in channels 36 and then passes upwardly through the downwardly streaming oil and into the nozzles of the unit next above. The bubbling process is repeated through each of the entire series of units and such gas as rises from unit A passes from dome 12 through outlet pipe 15.

Preferably, a "mist collector" is provided in dome 12. (See Figs. 1 and 11.) While this collector may be of any suitable type, I have illustrated a preferred embodiment in the form of duct 50, open at one end 51 for the admission of "mist" and closed at end 52. About the periphery of duct 50 are arranged vertical baffles 53 which stop short of the duct bottom 54. Outlet pipe 15 has an elbow 55, projecting into the top of the duct. The oil is extracted as the mist strikes baffles 53, the free gas passing off through pipe 15 and the oil dropping to the bottom of the duct, flowing beneath baffles 53 and through pipes 56' into trough 42 of unit A; the oil in said trough forming a liquid seal for the pipes. The mixture of oil and gas descending from the lowermost unit H is taken off through pipe 16.

The oil in channels 36 is continually flowing from the center of troughs 28 towards openings 37 at the ends of said troughs and therefore each particle of oil traverses a plurality of orifices G, receiving oil treatment as it registers with each orifice. This insures repeated contact between oil and gas, and assures a thorough mixture thereof. Mixture also occurs during the passage of the gas through the descending oil between units.

As the oil flows through openings 37 into spaces 23ᵃ it becomes settled or quiescent and foaming practically ceases, a very desirable condition.

The volume and pressure of the gas gradually diminishes as it passes through the units and therefore the oil depths in successively higher units are successively lowered or graduated by properly adjusting collars 39 so the gas under reduced pressure may be enabled to properly displace the oil in channels 35 and continue to bubble through the oil in channels 36. In other words, the units are independently adjusted to operate under differential pressures.

It will be seen that heads X vary with the fluid level as established by collars 39, and that heads Y vary with the pressure of gas.

Test cocks 44 open into shell 10 at suitable intervals so that operator may keep himself advised as to conditions within the tower.

It will be understood it lies within the scope of my invention to provide the oil troughs and bubble caps of other than rectangular cross section. For instance, they might well be V or U-shaped. It will be seen they may be outlined and completely punched from sheet metal in one operation and then bent to shape by another operation.

When the tower is to be used for certain purposes, the overflow collars 39 may be adjusted to maintain the oil level at such a height as will cause it to overflow the sides or flanges of the oil troughs, and when so used, it is desirable that said flanges be perforated or notched as at 30ª in Fig. 10, to deliver the oil in fine streams, thus washing and breaking the bubbles beneath.

While I have shown and described a specific embodiment of my invention, I do not wish to be limited thereto except for such limitation as the claims may import.

I claim:

1. In a bubble tower, a series of bubbling units arranged one above another, each unit including a plurality of elongated liquid containing troughs through which gas is adapted to be bubbled, a distributing trough below and in communication with all of said first mentioned troughs, said distributing trough being disposed over the centers of the liquid containing troughs of the unit below.

2. In a bubble tower, a series of bubbling units arranged one above another, each unit including a plurality of elongated liquid containing troughs through which gas is adapted to be bubbled, a settling chamber communicating with the troughs of each unit, a distributor provided between adjacent units and adapted to deliver liquid to the troughs of the unit next below, and a vertically adjustable overflow pipe connecting between each settling chamber and the distributor below.

3. In a bubble tower, a series of bubbling units arranged one above another, each unit including a plurality of elongated liquid containing troughs through which gas is adapted to be bubbled, a settling chamber in communication with all of said troughs, a distributing trough below and disposed over the liquid containing troughs of the unit below; and an overflow pipe connecting the chamber and distributing trough.

4. In a bubble tower, a shell, a plurality of substantially parallel liquid containing troughs supported within the shell and horizontally spaced apart to provide gas nozzles therebetween, bubble caps bridging the spaces between the troughs and having flanges which extend into adjacent troughs spaced from the gas nozzles and dividing said troughs into a plurality of channels, said flanges having orifices which provide for communication between all of said channels in a given trough; the ends of said troughs terminating short of the shell walls, partitions closing the major portions of the trough and cap ends but having restricted openings registering with certain of said channels, and a floor plate defining the bottom of a settling chamber which is otherwise defined by said partitions and said shell walls.

5. In a bubble tower, a shell, a plurality of substantially parallel liquid containing troughs supported within the shell and horizontally spaced apart to provide gas nozzles therebetween, bubble caps bridging the spaces between the troughs and having flanges which extend into adjacent troughs and divide said troughs into a plurality of channels, there being provided passageways between the nozzles and certain of said channels, said flanges having orifices which provide for communication between all of said channels in a given trough; the ends of said troughs terminating short of the shell walls, partitions closing the major portions of the trough and cap ends but having restricted openings registering with certain of said channels, a floor plate defining the bottom of a settling chamber which is otherwise defined by said partitions and said shell walls, and an overflow pipe projecting upwardly into said chamber and extending downwardly through said bottom.

6. In a bubble tower, a bubbling unit including a plurality of horizontal parallel liquid holding troughs forming upwardly projecting nozzles to direct gas up through the troughs, inverted channels supported over the nozzles, a common chamber at each end of the troughs and with which the opposite ends of each trough communicate, means to remove liquid from the common chamber, and means to deliver liquid to the central part of each trough.

7. In a bubble tower, a bubbling unit including a plurality of horizontal parallel liquid holding troughs forming upwardly projecting nozzles to direct gas up through the troughs, inverted channels supported over the nozzles, a common chamber at each end of the troughs and with which the opposite ends of each trough communicate, means to remove liquid from the common chamber, and means to deliver liquid to the central part of each trough, said last mentioned means comprising a distributing trough arranged above and across the parallel troughs.

8. In a bubble tower, a plurality of superposed bubbling units, each unit including a plurality of horizontal parallel elongated caps of inverted channel shape, said caps spaced apart to provide liquid holding channels between them extending from end to end of the caps, a liquid holding structure under the caps forming gas nozzles to deliver gas under the caps, a common liquid chamber at each end of the caps and with which chamber the said channels communicate at their ends; the channels of adjacent superposed units being arranged across each other, a distributing trough above the center of each unit arranged across the channels of that unit and parallel to the channels of the unit next above, and overflow means from the common chamber of each unit to the distributing trough next below.

9. In a bubble tower, a bubbling unit including a liquid holding structure forming a plurality of spaced upwardly projecting gas nozzles, inverted channel-shaped caps supported over the nozzles and spaced apart transversely to define liquid holding channels between them, and a common chamber at each end of the channels communicating with the ends of the channels defined between the caps.

In witness that I claim the foregoing I have hereunto subscribed my name this 11th day of April 1924.

RAYMOND B. MILLARD.